(12) United States Patent
Allen et al.

(10) Patent No.: US 12,025,561 B2
(45) Date of Patent: Jul. 2, 2024

(54) MATERIAL IDENTIFICATION THROUGH IMAGE CAPTURE OF RAMAN SCATTERING

(71) Applicant: Ohio State Innovation Foundation, Columbus, OH (US)

(72) Inventors: Heather Allen, Grandview Heights, OH (US); Juan Velez, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 365 days.

(21) Appl. No.: 17/604,006

(22) PCT Filed: Apr. 15, 2020

(86) PCT No.: PCT/US2020/028254
§ 371 (c)(1),
(2) Date: Oct. 15, 2021

(87) PCT Pub. No.: WO2020/214661
PCT Pub. Date: Oct. 22, 2020

(65) Prior Publication Data
US 2022/0214280 A1     Jul. 7, 2022

Related U.S. Application Data

(60) Provisional application No. 62/834,245, filed on Apr. 15, 2019.

(51) Int. Cl.
*G01N 21/65* (2006.01)
*G01J 3/18* (2006.01)
(Continued)

(52) U.S. Cl.
CPC ............... *G01N 21/65* (2013.01); *G01J 3/18* (2013.01); *G01J 3/2823* (2013.01);
(Continued)

(58) Field of Classification Search
CPC ... G01N 21/65; G01N 2201/1296; G01J 3/18; G01J 3/12; G01J 3/44
See application file for complete search history.

(56) References Cited

U.S. PATENT DOCUMENTS

| 7,420,663 B2 | 9/2008 | Wang et al. |
| 8,537,343 B2 | 9/2013 | Zhang |

(Continued)

FOREIGN PATENT DOCUMENTS

| CN | 110263681 A | * 9/2019 | ......... G06K 9/00268 |
| WO | 2017/019988 A1 | 2/2017 | |

OTHER PUBLICATIONS

Shan Huang, "Blood species identification based on deep learning analysis of Raman spectra", Dec. 2019 (Year: 2019).*

(Continued)

*Primary Examiner* — Maurice C Smith
(74) *Attorney, Agent, or Firm* — Meunier Carlin & Curfman LLC

(57) ABSTRACT

A hand-held sized imaging instrument identifies molecules with high selectivity and in complex mixtures. The instrument uses inelastic scattering and scattering intensities from with machine learning algorithms based on convolutional neural networks (CNN's) to identify the presence of a specified chemical or combination of chemicals. A laser is housed within the instrument to initiate a material response of a sample using laser light of a specified wavelength. The instrument uses an image sensor to capture visible images with inelastic scattering information. The CNN is able to classify the image to determine whether the specified chemical or combination of chemicals is present in the sample. The instrument is inexpensive, portable, easy to use by anyone (nonchemist, nonprofessional), and safe (laser is completely housed). The instrument can be used efficiently and easily (Continued)

for quality control, security, and other applications to reliably detect the presence of specified substances.

13 Claims, 13 Drawing Sheets

(51) Int. Cl.
 *G01J 3/28* (2006.01)
 *G01J 3/44* (2006.01)
(52) U.S. Cl.
 CPC .. *G01J 3/4412* (2013.01); *G01N 2201/06113* (2013.01); *G01N 2201/1296* (2013.01)

(56) References Cited

U.S. PATENT DOCUMENTS

| | | | |
|---|---|---|---|
| 2010/0118300 | A1 | 5/2010 | Wang et al. |
| 2011/0279901 | A1 | 11/2011 | Watanabe |
| 2012/0019819 | A1 | 1/2012 | Messerchmidt |
| 2015/0146214 | A1 | 5/2015 | Naoi |
| 2015/0204789 | A1 | 7/2015 | Akkus et al. |
| 2016/0103070 | A1* | 4/2016 | Kyoung .............. G01N 21/65 356/301 |
| 2021/0158080 | A1* | 5/2021 | Price ....................... G06T 7/33 |

OTHER PUBLICATIONS

International Search Report and Written Opinion, issued by the International Searching Authority (ISA/US) in PCT Application No. PCT/US2020/028254 on Aug. 19, 2020. 11 pages.
Brand, John C. D. (1995). Lines of Light: The Sources of Dispersive Spectroscopy, 1800-1930. Gordon and Breach Publishers. p. 57. ISBN 2884491627.
Littauer, S. (1950). The Development of Statistical Quality Control in the United States. The American Statistician, 4(5), 14-20. doi:10.2307/2681449.
Karydas, A. G., Kotzamani, D., Bernard, R., Barrandon, J. N., & Zarkadas, C. (2004). A compositional study of a museum jewellery collection (7th-1st BC) by means of a portable XRF spectrometer. Nuclear Instruments and Methods in Physics Research Section B: Beam Interactions with Materials and Atoms, 226(1-2), 15-28.
Ingelfinger, J. R. (2008). Melamine and the global implications of food contamination. New England Journal of Medicine, 359(26), 2745-2748.
Centers for Disease Control and Prevention (CDC. (2009). Multistate outbreak of Salmonella infections associated with peanut butter and peanut butter-containing products—United States, 2008-2009. MMWR. Morbidity and mortality weekly report, 58(4), 85.
Hanna-Attisha, M., LaChance, J., Sadler, R. C., & Champney Schnepp, A. (2016). Elevated blood lead levels in children associated with the Flint drinking water crisis: a spatial analysis of risk and public health response. American journal of public health, 106(2), 283-290.
Mac Kenzie, W. R., Hoxie, N. J., Proctor, M. E., Gradus, M. S., Blair, K. A., Peterson, D. E., . . . & Davis, J. P. (1994). A massive outbreak in Milwaukee of Cryptosporidium infection transmitted through the public water supply. New England journal of medicine, 331(3), 161-167.
Noelia Tena, Diego L. García-González, and Ramón Aparicio. Evaluation of Virgin Olive Oil Thermal Deterioration by Fluorescence Spectroscopy Journal of Agricultural and Food Chemistry 2009 57 (22), 10505-10511 DOI: 10.1021/jf902009b.
Buchalla, W. (2005). Comparative fluorescence spectroscopy shows differences in noncavitated enamel lesions. Caries research, 39(2), 150-156.
Donahue, J., Jia, Y., Vinyals, O., Hoffman, J., Zhang, N., Tzeng, E., & Darrell, T. (2014, January). Decaf: A deep convolutional activation feature for generic visual recognition. In International conference on machine learning (pp. 647-655).
Liu, C., Zoph, B., Shlens, J., Hua, W., Li, L. J., Fei-Fei, L., . . . & Murphy, K. (2017). Progressive neural architecture search. arXiv preprint arXiv:1712.00559.
Zoph, B., Vasudevan, V., Shlens, J., & Le, Q. V. (2017). Learning transferable architectures for scalable image recognition. arXiv preprint arXiv:1707.07012, 2(6).
Moore, D. S., & Scharff, R. J. (2009). Portable Raman explosives detection. Analytical and bioanalytical chemistry, 393(6-7), 1571-1578.
Quang, L. X., Lim, C., Seong, G. H., Choo, J., Do, K. J., & Yoo, S. K. (2008). A portable surface-enhanced Raman scattering sensor integrated with a lab-on-a-chip for field analysis. Lab on a Chip, 8(12), 2214-2219.
Sharma, S. K., Misra, A. K., & Sharma, B. (2005). Portable remote Raman system for monitoring hydrocarbon, gas hydrates and explosives in the environment. Spectrochimica Acta Part A: Molecular and Biomolecular Spectroscopy, 61(10), 2404-2412.
Jehlička, J., Vitek, P., Edwards, H. G. M., Hargreaves, M., & Čapoun, T. (2009). Rapid outdoor non_destructive detection of organic minerals using a portable Raman spectrometer. Journal of Raman Spectroscopy: An International Journal for Original Work in all Aspects of Raman Spectroscopy, Including Higher Order Processes, and also Brillouin and Rayleigh Scattering, 40(11), 1645-1651.
Goodfellow, I., Bengio, Y., Courville, A., & Bengio, Y. (2016). Deep learning (vol. 1). Cambridge: MIT press. Retrieved URL: http://www.deeplearningbook.org.
Shen, Y., & Bax, A. (2010). SPARTA+: a modest improvement in empirical NMR chemical shift prediction by means of an artificial neural network. Journal of biomolecular NMR, 48(1), 13-22.
Sorsa, T., & Koivo, H. N. (1993). Application of artificial neural networks in process fault diagnosis. Automatica, 29(4), 843-849.
Schütt, K. T., Arbabzadah, F., Chmiela, S., Müller, K. R., & Tkatchenko, A. (2017). Quantumchemical insights from deep tensor neural networks. Nature communications, 8, 13890.
Duvenaud, D. K., Maclaurin, D., Iparraguirre, J., Bombarell, R., Hirzel, T., Aspuru-Guzik, A., & Adams, R. P. (2015). Convolutional networks on graphs for learning molecular fingerprints. In Advances in neural information processing systems (pp. 2224-2232).
International Preliminary Report on Patentability issued for Application No. PCT/US2020/028254, dated Oct. 28, 2021.

* cited by examiner

|  | X Brand | Y Brand | Z Brand |
|---|---|---|---|
| Coffee | 99.2% Dunkin, vanilla | 86.1% Fairfire, light | 82.1% Staufs, Med |
| Coffee - Light Roast | 80.1% Fairfire, light | 98% Starbucks, light | 99.4% Gevalia, light |
| Coffee - Medium | 99.8% Staufs Med | 99.6% Dunkin Med | 97.4% Maxwell House |
| Acetaminophen | 99.7% Tylenol | 98.4% generic | |
| Fatty Acids | 99% Lauric Acid, C12 | 90% Palmitic Acid, C16 | 98% Stearic Acid, C18 |

FIG. 6

MATERIAL IDENTIFICATION THROUGH IMAGE CAPTURE OF RAMAN SCATTERING

CROSS-REFERENCE TO RELATED APPLICATIONS

This application is a national stage application filed under 35 U.S.C. § 371 of PCT/US2020/028254 filed Apr. 15, 2020, which claims the benefit of U.S. Provisional Patent Application Ser. No. 62/834,245 filed Apr. 15, 2019, the disclosure of which is expressly incorporated herein by reference.

BACKGROUND

Spectroscopy involves the measurement of interactions between electromagnetic radiation and matter to identify materials. Raman spectroscopy involves the measurement of inelastic scattering of light off of a sample. Because the inelastic scattering may result in a relatively weak signal, Raman spectroscopy may typically involve the use of fiber optic probes and other expensive and specialized equipment.

SUMMARY

In a first aspect of the disclosure, an imaging device comprises an illumination source configured to supply monochromatic light along an illumination path. An image sensor is positioned along the detection path and configured to capture an image of scattered light reflected from a sample zone. An optical assembly is positioned in the illumination path and adapted to direct the monochromatic light from the illumination source to the sample zone, the optical assembly also directs the scattered light to the image sensor. A filter is positioned in the illumination and/or detection path and configured to select a predetermined range of wavenumber of the scattered light.

In some implementations of the first aspect of the disclosure, the image comprises a spatial distribution of an amount of reflected light in the predetermined range of wavenumber of the light reflected from a substance in the sample zone.

In some implementations of the first aspect of the disclosure, the device further comprises a processor configured to receive the image from the image sensor and processes the received image with a trained neural network to classify the image to identify the substance in the sample zone.

In some implementations of the first aspect of the disclosure, the predetermined range of wavenumber is for inelastically scattered light.

In some implementations of the first aspect of the disclosure, the optical assembly comprises a dichroic mirror positioned along the illumination path between the illumination source, the sample zone, and the image sensor. The dichroic mirror is a longpass mirror filter with reflection in a second range that encompasses the predetermined range of wavenumber.

In some implementations of the first aspect of the disclosure, the filter comprises a bandpass filter that is configured to filter light within the predetermined range of wavenumber, the bandpass filter is positioned in the detection path between the sample zone and the image sensor.

In some implementations of the first aspect of the disclosure, the optical assembly comprises a spherical lens positioned in the detection path between the bandpass filter and the image sensor.

In some implementations of the first aspect of the disclosure, the device further comprises an edge filter positioned in the detection path between the dichroic mirror and the bandpass filter.

In some implementation, a wavelength dispersive assembly may be integrated before the image sensor at different positions between filters.

In some implementations of the first aspect of the disclosure, the device further comprises an illumination source line cleaning filter configured to filter spurious frequencies of light generated by the illumination source, the illumination source line clearing filter positioned between the illumination source and the dichroic mirror.

In some implementations of the first aspect of the disclosure, the device further comprises a diffraction grating positioned in the detection path between the filter and the image sensor.

In some implementations of the first aspect of the disclosure, the device further comprises a housing, the housing comprising an imaging surface with a slit formed therein for receiving light passing through the diffraction grating.

In some implementations of the first aspect of the disclosure, the device further comprises a magnification lens assembly adapted to magnify the monochromatic light along the illumination path to extend across an assay.

A second aspect of the disclosure provides a method of training a neural network to classify an image captured from a device as an identified substance. The method comprises capturing, by an image sensor, a first set of a predetermined number of images of scattered light from a known substance. In each of the predetermined number of images the known substance is illuminated over an integration time by a monochromatic light source at a first location in a sample zone. The scattered light is filtered to a predetermined range of wavenumber. The method comprises supplying the first set of images as training input to a neural network executing on a processor and determining, by the processor, whether the neural network correctly classifies a threshold amount of the first set of images as being from the known substance. Upon a determination that the neural network correctly classifies less than the threshold amount of the first set of images as being from the known substance, capturing, by the image sensor, a second set of the predetermined number of images of scattered light from the known substance illuminated by the monochromatic light source at a second location in the sample zone.

In some implementations of the second aspect of the disclosure, the method further comprises supplying monochromatic light from the light source along an illumination path and directing the monochromatic light from the light source to the sample zone.

In some implementations of the second aspect of the disclosure, the monochromatic light from the light source is directed to the sample zone with a dichroic mirror positioned along the illumination path.

In some implementations of the second aspect of the disclosure, the method further comprises filtering the scattered light with a bandpass filter to the predetermined range of wavenumber.

In some implementations of the second aspect of the disclosure, the method further comprises validating, prior to capturing the first set of predetermined number of images, that light scattered from the known substance is within a valid range of wavenumber when illuminated by the monochromatic light source. In some implementations of the second aspect of the disclosure, the valid range of wavenumber is within a range of wavenumber for Raman scattering.

In some implementations of the second aspect of the disclosure, the method further comprises passing the scattered light through a wavelength dispersive assembly to determine a range of wavenumber present in the scattered light. The validating also comprises comparing, by the processor, the range of wavenumber present in the scattered light to the valid range of wavenumber.

In some implementations of the second aspect of the disclosure, the wavelength dispersive assembly comprises a spectrometer, a prism, or a diffraction grating.

In some implementations of the second aspect of the disclosure, the method further comprises comparing, by the processor, the range of wavenumber present in the scattered light with a pre-stored spectrum of the known substance maintained in a database.

A third aspect of the disclosure provides a method of identifying an unknown substance with a trained neural network to classify an image captured from a device as an identified substance. The method comprises capturing, by an image sensor, a first image of scattered light from the unknown substance. In the first image, the unknown substance is illuminated over a first integration time by a first monochromatic light source in a sample zone. The scattered light for the first image is filtered to a predetermined range of wavenumber. The method comprises capturing, by the image sensor, a second image of scattered light from the unknown substance, wherein in the second image, the unknown substance is illuminated over a second integration time by a second monochromatic light source in the sample zone. The scattered light for the second image is filtered to a second predetermined range of wavenumber. The method further comprises supplying the first and second images as input to a trained neural network executing on a processor and identifying, by the neural network, the unknown substance based on the first and second images.

A fourth aspect of the disclosure provides a method for detection of a virus and/or an antibody or antigen for the virus. The method comprises illuminating an assay of serum or bodily secretion in a sample zone over an exposure time by a monochromatic light source. The method comprises capturing, by an image sensor, an image of an array of well emissions of scattered light from the assay, wherein the scattered light is filtered to a predetermined range of wavenumber. The method comprises supplying the image as an input to a trained neural network executing on a processor. The method comprises determining, by the neural network, a classification of whether the virus and/or antibodies to the virus is detected in each well emission of the array of well emissions in the image.

In some implementations of the fourth aspect of the disclosure, the method further comprises magnifying the monochromatic light source such that an array of wells on the assay are illuminated by the magnified monochromatic light source.

In some implementations of the fourth aspect of the disclosure, the virus is COVID 19.

In some implementations of the fourth aspect of the disclosure, the predetermined range of wavenumber is for capturing fluorescence, Stokes scattering, or anti-Stokes scattering from the assay.

In some implementations of the fourth aspect of the disclosure, the well emissions of scattered light from the assay comprise a different spectrum of light than the monochromatic light source.

In some implementations of the fourth aspect of the disclosure, the method further comprises determining, by the neural network, a concentration of the virus present in one or more wells of the assay.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 6 illustrates experimental results of accuracy of detection of specified compositions.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

A hand-held sized imaging instrument identifies molecules with high selectivity and in complex mixtures. The imaging instrument uses inelastic scattering and scattering intensities from solid, powder, or liquid samples with machine learning algorithms based on convolutional neural networks (CNN's) to identify the presence of a specified chemical. A laser is housed within the instrument to initiate a material response of a sample using laser light of a specified wavelength. The instrument uses an image sensor to capture visible images with inelastic scattering information. The CNN is able to classify the image to determine whether the specified chemical is present in the sample. The imaging instrument is inexpensive, portable, easy to use by anyone (nonchemist, nonprofessional), and safe (laser is completely housed). The imaging instrument can be easily assembled, such as using a 3D printed housing and readily available parts and software. The imaging instrument can be used efficiently and easily for quality control, security, and other applications to reliably detect the presence of specified substances.

Figure 1:
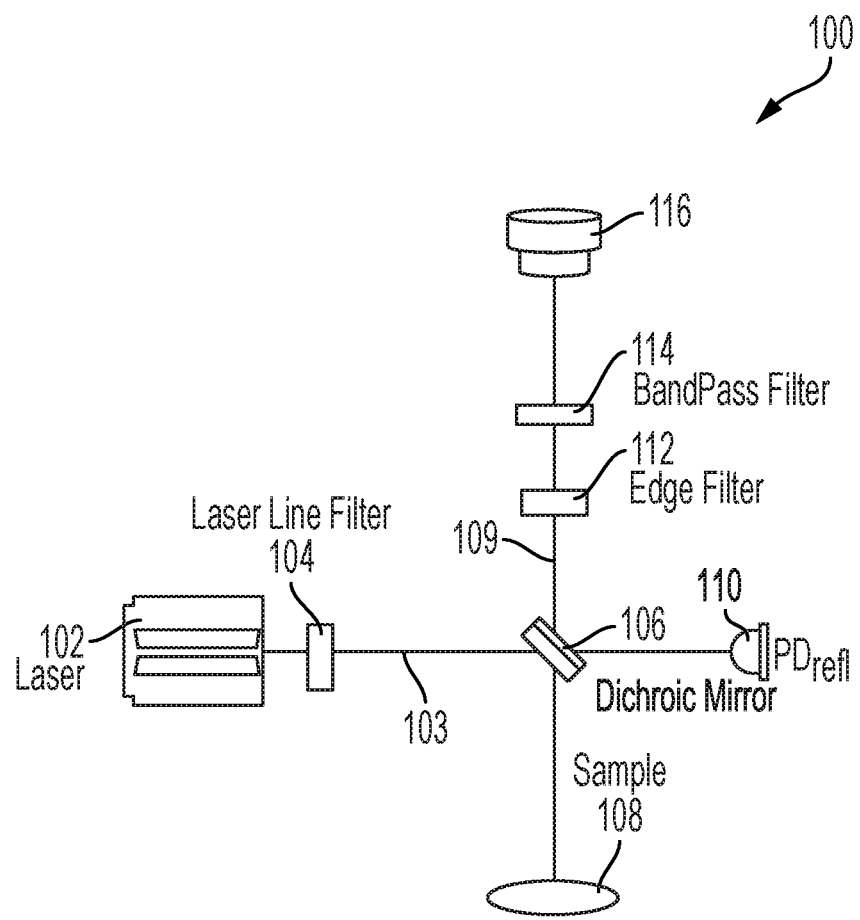
FIG. 1 illustrates an optical system diagram of the imaging instrument suitable for implementing the several embodiments of the disclosure.

FIG. 1 illustrates an optical system of an imaging instrument 100 suitable for implementing the several embodiments of the disclosure. The imaging instrument 100 is a hand-held sized system configured to identify molecules with high selectivity and in complex mixtures. The imaging instrument 100 is configured to capture images of inelastic scattering and scattering intensities from solid, powder, or liquid samples. Inelastic scattering is a type of vibrational spectroscopy that can identify the molecular nature or class of a sample based on a measured scattering phenomena. In particular, inelastic scattering is useful when the scattering is captured in the molecular fingerprint region of 200-1800 $cm^{-1}$. Different molecules have a distinct response when irradiated by a monochromatic source of light due to an induction change of the molecule's intrinsic electric field, that is, the polarizability. This makes possible to identify a particular molecule without the use of labels. Accordingly, the imaging instrument 100 is a portable (fits in the hand), light weight, multi-modal device that combines visible images with inelastic scattering information, and a supervised machine learning technique (convolutional neural network, CNN) to enable the classification of substances.

The imaging instrument 100 comprises a monochromatic light source 102, such as a laser. In some implementations, the light source 102 comprises a laser diode at 405 nm with a full width at half maximum (FWHM) of 5 nm. In some implementations, the light source 102 is a laser light with a maximum power of 150 mW to initiate the material response. Other laser wavelengths, such as 532 nm, 650 nm, or others which can additionally excite Raman scattering, can be incorporated depending on the application. The 405 nm laser is well suited for general molecular identification and is generally inexpensive. For 405 nm and 532 nm laser wavelengths, it was found that a wide variety of filters match the Raman shift in the region of interest, yet, the power/price ratio was higher for the 405 nm laser. Another important aspect is that the power of the Stokes inelastic scattering signal is around 3 times higher for the 405 nm laser because the 405 nm photons are more energetic. In addition, the fluorescence signal is shifted by more wavelengths relative to use of the 532 nm laser. This gives a wider and cleaner scattering spectral region.

An optical source filter 104 is positioned in an illumination optical path 103 between the light source 102 and a dichroic mirror 106. The optical source filter 104, such as a laser line filter, cleans the excitation light produced by the light source 102 to avoid spurious frequencies that are common in inexpensive lasers. In an example, the optical source filter 104 is a laser line filter from THORLABS with a FWHM of 10±2 nm.

The dichroic mirror 106 is configured to reflect the excitation light from the light source 102 90° to a sample area 108. In various implementations, the dichroic mirror 106 is a dichroic longpass mirror filter with 95% of reflection in the region of 350-410 nm, such as those produced by OMEGA OPTICAL, INC. When a sample is present in the sample area 108, the excitation light is scattered based on the molecule(s) present in the sample. In various implementations, a fraction of a teaspoon (e.g., less than 1 gram) of the sample is used. The imaging instrument 100 is operable to detect targeted molecules from solid, powder, or liquid samples. The scattered radiation is directed back along a detection optical path 109 between the sample area 108 and an image sensor and filtered again by the dichroic mirror 106. In some implementations, the dichroic mirror 106 is a dichroic longpass mirror with a cut-on wavelength at 410 nm.

A photodiode 110 is for laser intensity control usually stabilized better than 1%. This is accomplished using a proportional integrative derivative controller with a microcontroller.

The optical system along the detection optical path 109 includes a series of filters that together are able to select only those frequencies associated with a very active region for inelastic scattering in many organic molecules. The detection optics include, an edge filter 112 that is used to mitigate (e.g., filter out) part of the Rayleigh (elastic) scattering. In some implementations, the edge filter 112 is a longpass filter with a cut-on wavelength at 420 nm. The detection optics also include a bandpass filter 114 that also helps in filtering of Rayleigh radiation but at the same time chooses only the region of interest. In some implementations, the bandpass filter 114 is a 430 nm bandpass filter with a FWHM of 2 nm. The scattered photons are collected by a spherical lens 116 attached to an image sensor. In some applications a wavelength dispersive assembly is also implemented in the detection path 109.

The selection of low cost filters and lasers commercially available is an important aspect for keeping the cost of the imaging instrument 100 low, yet selective. For example, in some implementations, the imaging instrument 100 may cost as little as $250 or less, plus the cost of a consumer grade image sensor, such as that found in a typical cell phone. In the examples provided herein, the image sensor is a SONY EXMOR RS camera sensor. In various implementations, either a single image sensor, multiple image sensors, or a cell phone with the image sensor is placed on a holder and adapted to capture an image of the scattered light collected by the spherical lens 116.

In some implementations, a 390 nm laser may be used to excite the lowest Raman frequency at around 1000 $cm^{-1}$. Because fluorescence is avoided in this range, the blue channel of the Bayer filter of the image sensor may be used for the same purpose as the bandpass filter 114. In this example implementation, the bandpass filter 114 may not be need.

The image represents the actual image taken by the image sensor after the filtering at the determined frequencies (based on which filter sets we use and what the optical density is of the filters). The image captured by the image sensor shows the placement and intensity of pixels relative to another. The amount of light received by the image sensor is associated with the interaction between laser light and sample.

When the light source 102 is a 405 nm laser, fluorescence is avoided in the region between 881 $cm^{-1}$ and 1200 $cm^{-1}$, and just two optical phenomena are present, Rayleigh Scattering (elastic) and Raman (inelastic) scattering. Raman scattering is a nonlinear effect resulting in the shift in wavelength from a known monochromatic source. This shift is equal to the vibrational frequency of the molecular bonds in the material and is useful in the identification of molecules. A large portion of the Rayleigh scattering is eliminated by the use of the dichroic mirror 106, the edge filter 112 and the bandpass filter 114. Additionally, the sensitivity of many image sensors are centered around 550 nm, so the Rayleigh scattering is negligible.

In various implementations, the image captured by the image sensor may be pre-processed prior to being input to a neural network for classification, as discussed in detail below. The image processing may include one or more of reducing the image size, scaling the pixel values to floating point numbers, and applying a convolution operation to the image. In some implementations, the captured image may be cropped to cut out zero intensity pixels on a periphery of the capture image.

The simple and inexpensive configuration of the imaging instrument 100 is in contrast to a typical imaging or spectroscopic instrument setup that can cost several thousand dollars just for the imaging sensors or the spectrometer. While the example above provides for selecting for the fingerprint region of inelastic scattering (e.g., 200-1800 $cm^{-1}$), other optics can select for capturing images of fluorescence, or elastic scattering (Rayleigh), or other substance emissions.

Accordingly, in various implementations, the imaging instrument 100 provides a portable device that is easy to use and integrated to a cell phone for quality control testing. Only an image of the sample is used for identification. The imaging method captures scattering and uses machine learning in a device to enable testing of any raw material or final product in any environment or condition. The device provides fast, inexpensive, and reliable feedback. The imaging instrument 100 can be used efficiently and easily for quality control to reliably differentiate substances. For instance, but not limited to, differentiating counterfeit food products, drugs, the presence of phytopathogens in vegetables and fruits, or the authenticity of non-prescription and prescription drugs.

Figure 2A:
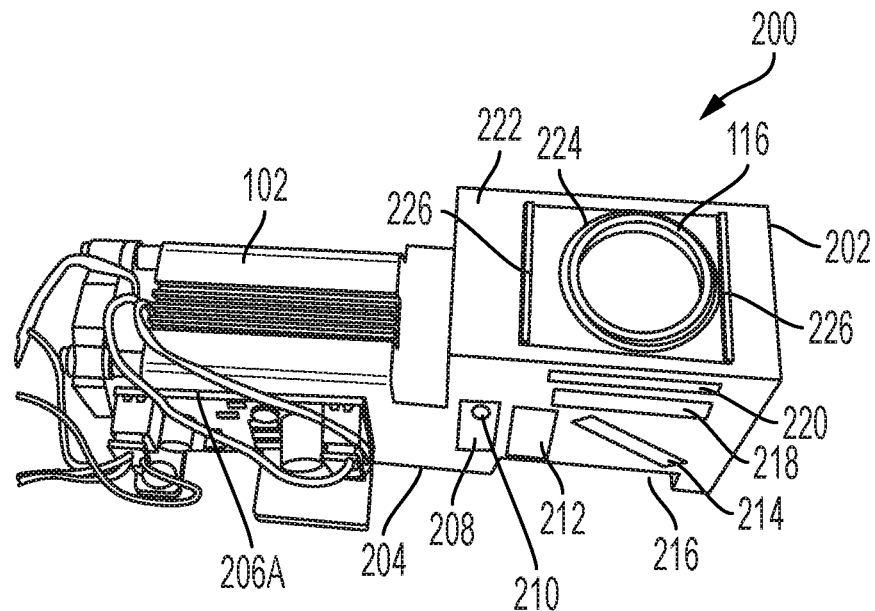
FIGS. 2A-2B illustrate a prototype imaging instrument suitable for implementing the several embodiments of the disclosure.
Figure 2B:
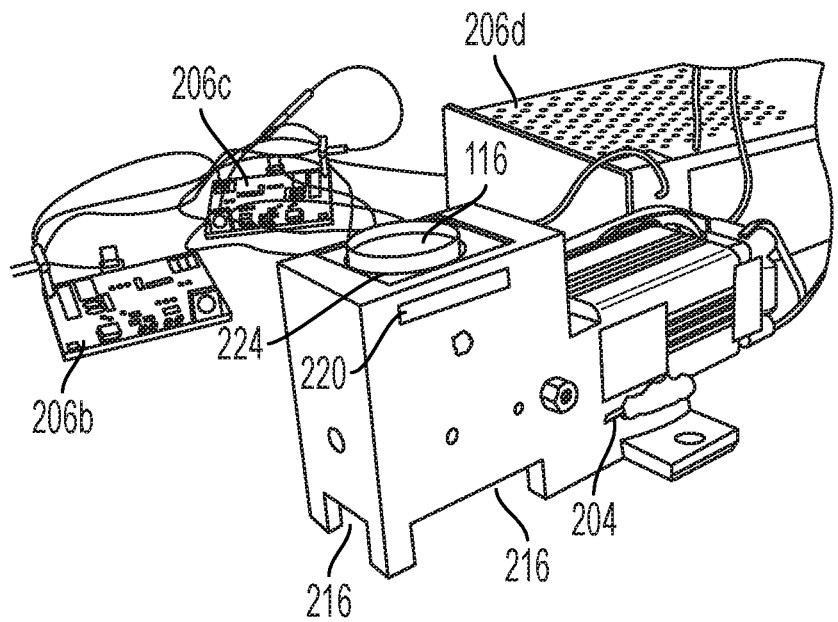

FIGS. 2A-2B illustrate a prototype instrument 200 suitable for implementing the several embodiments of the disclosure. The prototype instrument 200 includes a housing 202 for arranging the components of the imaging instrument 100 described above. In the example shown, the housing 202 is constructed as a 3D printed part. In some implementations, the housing 202 may be constructed of mechanical parts. The housing 202 comprises a light source mount 204 with one or more surfaces for mounting the light source 102 to the housing 202. The light source mount is 204. One or more control boards 206a-c and a power supply 206d provide a low cost control to enable laser mode, power stability, and control. The housing 202 may also include a focus ring slot 208 for accessing a focus ring 210 of the light source 102; this comprises an aperture and/or iris (not shown) through which excitation light produced by the light source 102 travels along the illumination optical path 103. In some implementations, the focus ring slot 208 and/or the focus ring 210 may be omitted.

A source filter slot 212 is sized and shaped to receive the optical source filter 104. A dichroic mirror slot 216 is sized and shaped to receive the dichroic mirror 106. One or more sample detection area slot(s) 216 provide access to the sample area 108. A holder (not shown) may be placed within the sample area slot 216 to align a sample with the sample area 108. An edge filter slot 218 is sized and shaped to receive the edge filter 112. A bandpass filter slot 220 is sized and shaped to receive the bandpass filter 114. A top surface 222 of the housing 202 comprises an aperture 224 sized and shaped to receive the spherical lens 116. The top surface 222 of the housing 202 may also include one or more alignment features 226 for aligning an image sensor of a cell phone with the spherical lens 116.

Figure 3A:
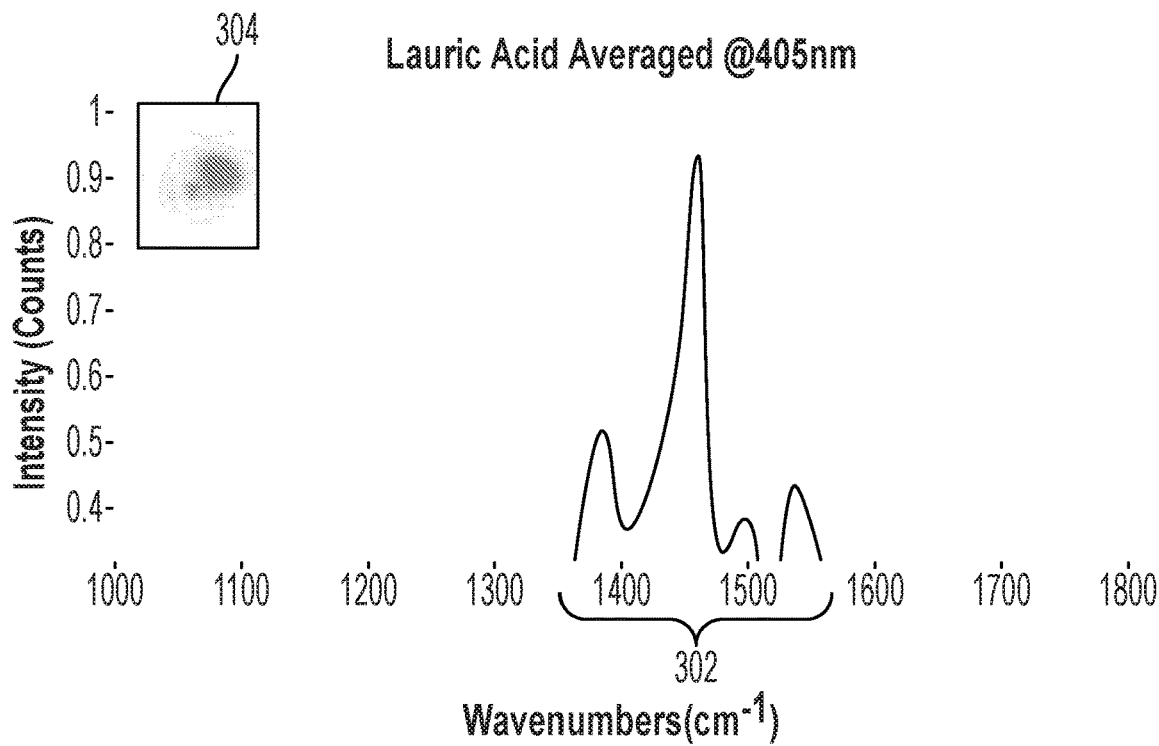
FIGS. 3A-3C illustrate images captured by the imaging instrument and corresponding Raman spectrum for an initial validation stage at a given excitation wavelength for specified materials.
Figure 3B:
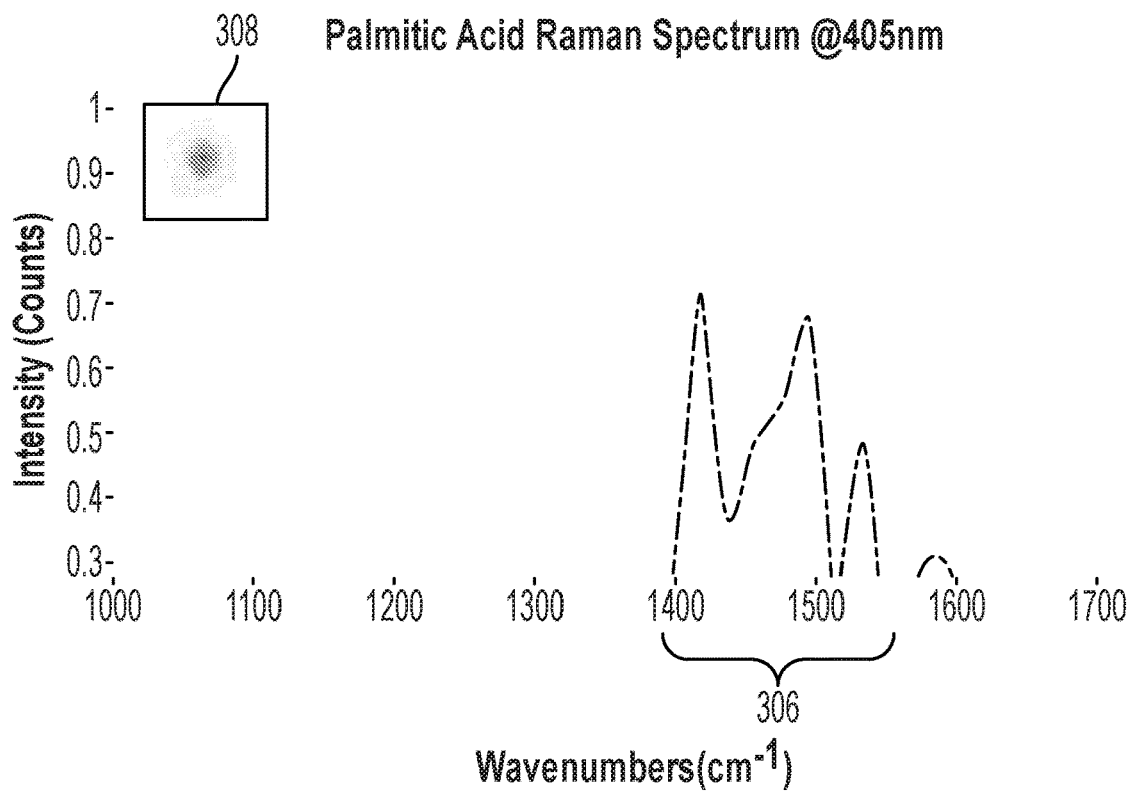
Figure 3C:
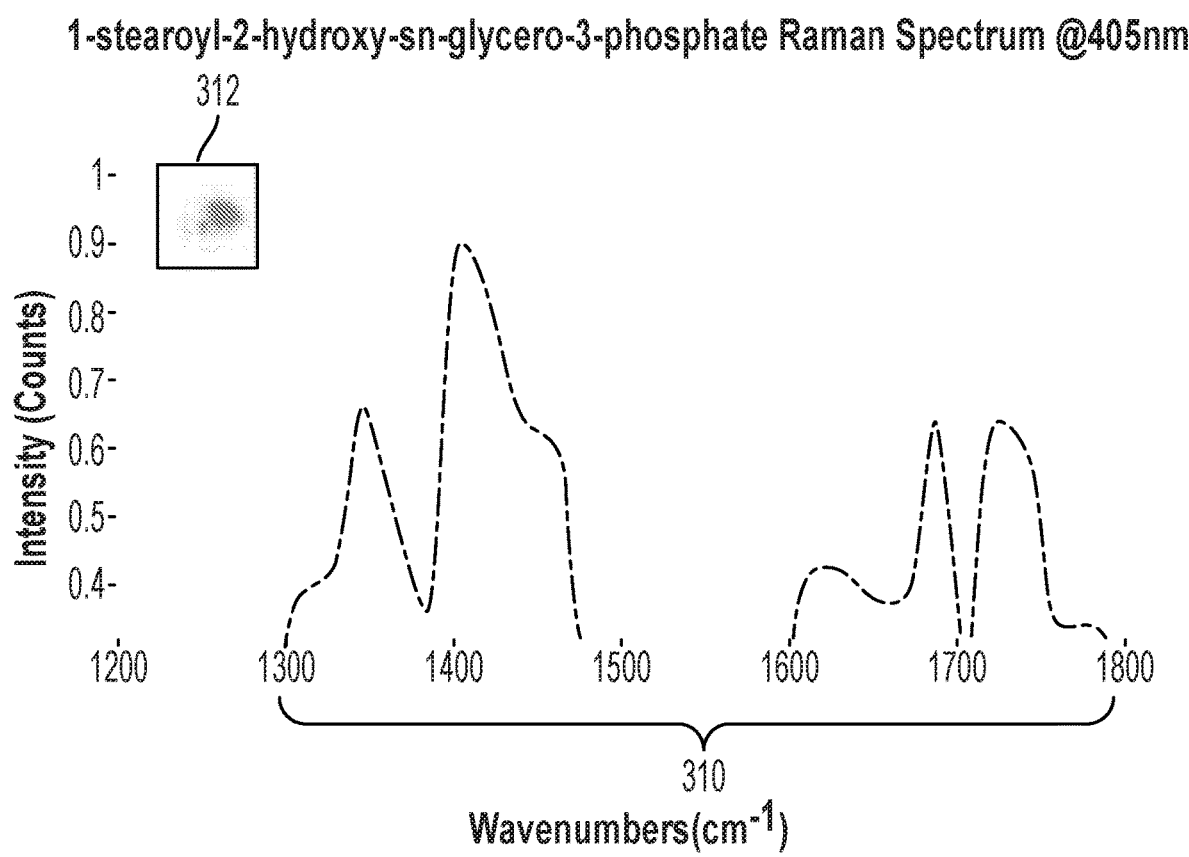

FIGS. 3A-3C illustrates images captured by the imaging instrument 100 and corresponding Raman spectrum at a given excitation wavelength for specified materials. In the examples shown, the excitation light is produced from a 405 nm laser. The example materials shown in the figures are different molecules of three types of lipids, including lauric acid, palmitic acid, and stearic acid, C:18. For palmitic and lauric acids, the Raman spectra are very similar (almost equal; e.g., 1300-1600 $cm^{-1}$). As such, even a skilled chemist may have difficulty properly differentiating these molecules with a standard spectrometer.

As shown in FIG. 3A, validation images and spectra are obtained. A first spectra 302 for lauric acid is shown; a first image 304 taken by the image sensor of the imaging instrument 100 is also shown. The first image 304 is taken with an exposure time of 500 milliseconds. As shown in FIG. 3B, a second spectra 306 for palmitic acid is shown; a second spectral image 308 taken by the image sensor of the imaging instrument 100 is also shown. The second image 308 is taken with an exposure time of 500 milliseconds. As shown in FIG. 3C, a third spectra 310 for stearic acid is shown; a third spectral image 312 taken by the image sensor of the imaging instrument 100 is also shown. The third spectral image 312 is taken with an exposure time of 500 milliseconds.

By "exposure time" it is meant the amount of time that the image sensor is receiving light. Each image formed over the image sensor is a linear combination of position (e.g., an x,y coordinate of the image sensor) together with the intensity of the scattered light. In some implementations, the exposure time may be obtained by capturing a number of images or an image capture sequence run time, where each image provides intensity information for a fraction of the exposure time. Multiple instances of capturing images for the exposure time may be averaged together. For example, a first set of images may be captured for obtaining a cumulative image with a 5 s exposure time. The cumulative image may be captured three times and averaged together to produce a final image.

In some implementations, rather than capturing multiple images, a shutter on the image sensor may be opened for the duration of the exposure time. In some implementations, a charge coupled device (CCD), CMOS or other image sensor (s) may be more suited to the cumulative exposure time.

Figure 4:
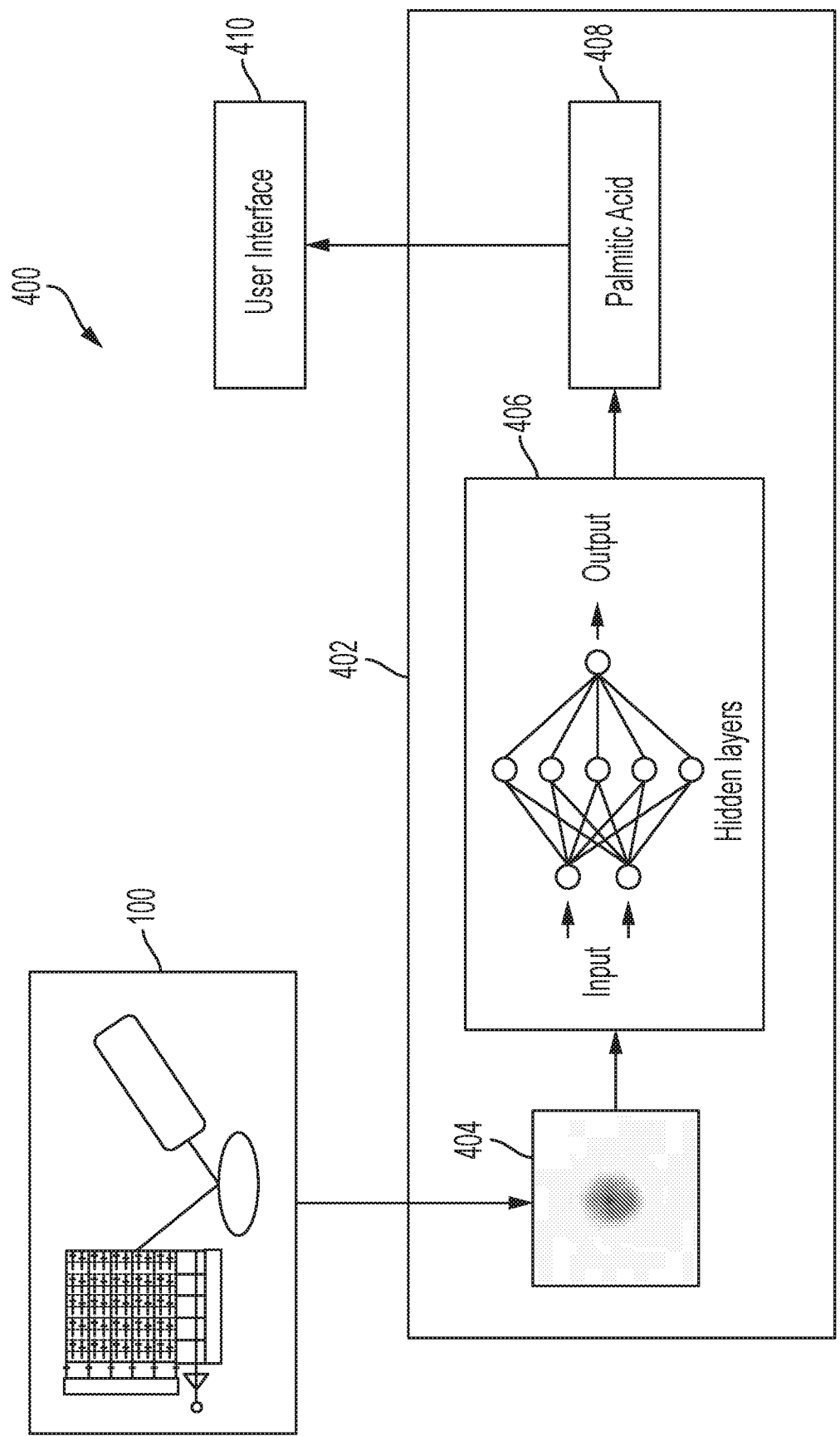
FIG. 4 illustrates a system block diagram of an imaging identification system suitable for implementing the several embodiments of the disclosure.

FIG. 4 illustrates a block diagram of an image processing identification system 400 suitable for implementing the several embodiments of the disclosure. The image processing identification system comprises the imaging instrument 100 and a computing device 402. The computing device 402 may be a laptop, desktop, smart phone, or other computer suitable for implementing the system described herein. Computing devices are described in more detail below with reference to FIG. 7. As described above, the imaging instrument 100 is configured to generate an image 404. The computing device 402 is configured to receive the image 404 from the imaging instrument 100. In some implementations, the image 404 may be captured by the computing device 402, such as when the computing device 402 is a smart phone.

The computing device 402 maintains a trained neural network 406 configured to receive the spectral image 404 as an input and produce as an output a classification 408 of whether or not the image 404 is of a sample with a target molecule. That is, the trained neural network 406 produces a binary classification of whether the sample has the target molecule or not. The computing device 402 may have or be in communication with a user interface 410 for displaying a result of the classification 408. In the example shown, the trained neural network 406 is trained to identify samples with palmitic acid. Upon receiving the second image 308 as an input, the trained neural network 406 is configured to classify the image as being from a sample containing palmitic acid.

In various implementations, the trained neural network 406 is a convolutional neural network (CNN). In some implementations, the trained neural network 406 is developed on the TENSORFLOW architecture. Other artificial intelligence architectures may be used. To improve the processing efficiency of the neural network 406, the amount of information provided by the image 404 is reduced by means of the filtering in the fingerprint region of inelastic scattering, as described above.

In the example shown, a single trained neural network 406 is provided for identifying a single target molecule (e.g., palmitic acid). In various implementations, the computing device 402 may have or have access to a library of trained neural networks (not shown), each configured to identify a separate target molecule.

Figure 5:
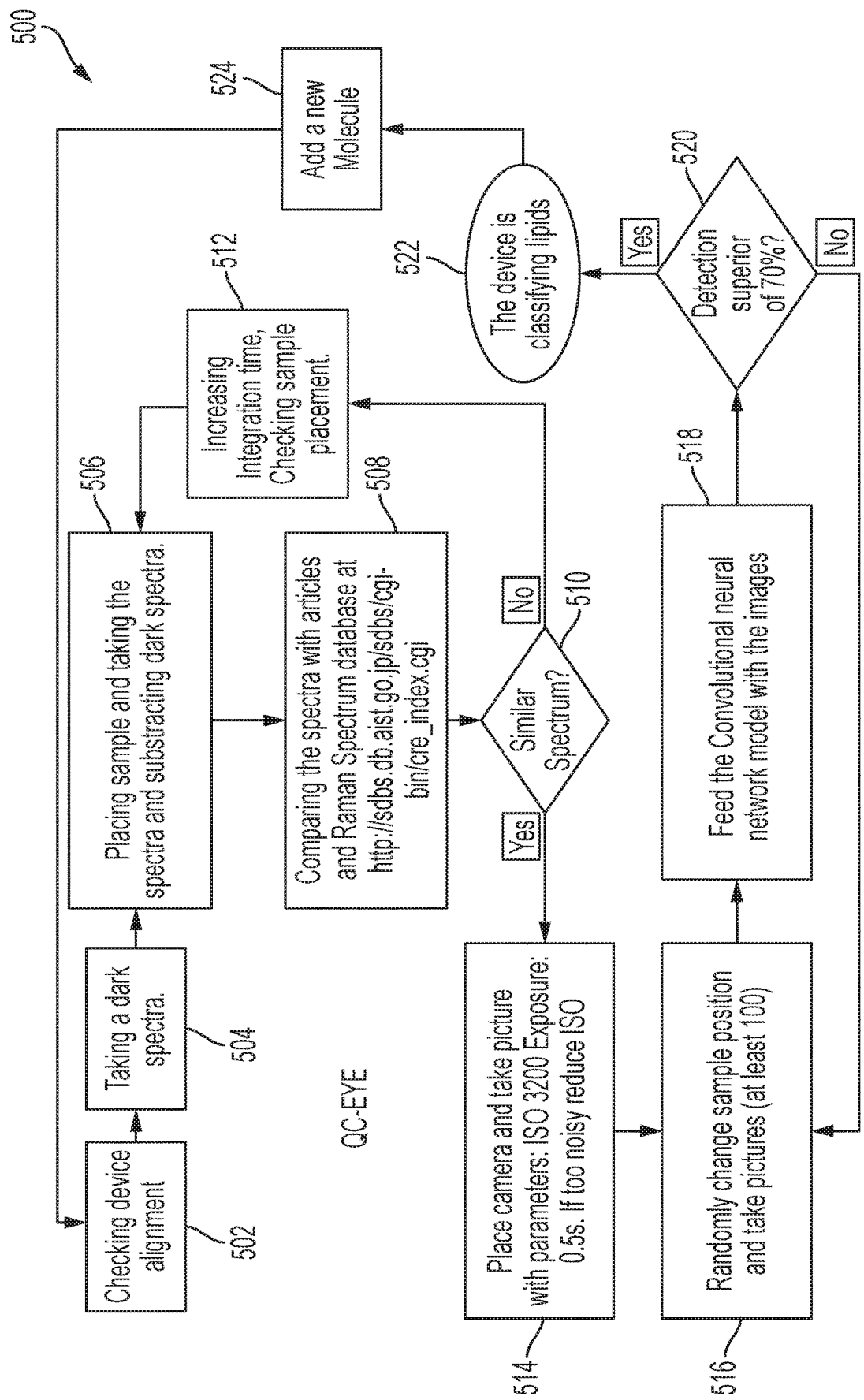
FIG. 5 illustrates alignment, initial validation, and a method for training a neural network suitable for implementing the several embodiments of the disclosure.

FIG. 5 illustrates a method 500 for first aligning and validating, and then training a neural network suitable for implementing the several embodiments of the disclosure. The neural network may be trained on the computing device 402 or a separate computing device. The method 500 initially makes use of a spectrometer coupled to the imaging instrument 100 to establish the presence of the inelastically scattered light associated with a molecule or compound of interest to be detected. Upon integration of a wavelength dispersive assembly, the imaging instrument 100 can also be used for validation. At 502, the device alignment is verified. At 504, a dark spectrum (e.g., spectrum of the ambient environment while the light source 102 is off) is captured by the spectrometer. At 506, a sample with a target molecule to be detected (e.g., palmitic acid, lauric acid, etc.) is placed in the sample area 108. A spectrum with the light source 102 on is captured by the spectrometer.

At 508, the captured spectrum is compared to known spectrum of the target molecule. At 510, a determination is made as to whether the captured spectrum is similar to the known spectrum of the target molecule. If not, at 512, the integration time is increased and the sample placement is verified and the process loops back to 506. In this way it is possible to know the spectral composition of the images to be captured by the image sensor in order to feed the neural network with valuable information about the identity of the sample molecules for training purposes.

In general, 502-510 provide for validating that light scattered from the known substance by the is within a valid range of wavenumber when illuminated by the monochromatic light source. For example, the valid range of wavenumber is within a range of wavenumber for Raman scattering (e.g., between 200-1800 $cm^{-1}$ and in some implementations between 881 $cm^{-1}$ and 1200 $cm^{-1}$). The validating comprises passing the scattered light through a wavelength dispersive assembly to determine a range of wavenumber present in the scattered light. A processor, such as computing device 402, compares the range of wavenumber present in the scattered light to the valid range of wavenumber. For pure molecules, the computing device 402 may compare the range of wavenumber present in the scattered light with pre-stored spectra of the molecule maintained in a database. Therefore, in addition to validating that the desired inelastic scattering is being obtained, the comparison validates that the scattering matches with known scattering characteristics of the molecule.

While the validation example described above makes use of a spectrometer to validate the desired scattering, any number of wavelength dispersive assemblies may be used to validate the desired scattering. For example, a diffraction grating may be used with the image sensor. Other wavelength dispersive assemblies known to those of ordinary skill in the art may be used to validate the desired scattering, such as a prism.

Otherwise at 514, the spectrometer is replaced with the image sensor (e.g., smart phone) or the wavelength dispersive assembly is removed. A test image is captured by the image sensor with a predetermined ISO setting and a predetermined exposure time. In an example, the predetermined ISO setting is at 3200 and the predetermined exposure time is 0.5 seconds. The captured image is evaluated to determine whether a noise level exceeds a noise threshold. If so, the ISO is reduced and another test image is captured. This process iterates until the noise level of the test image is below the noise threshold.

At 516, a set of sample images are taken with the image sensor, where each image is taken with a location of the sample randomly changed in the sample area 108. In an example, each set of sample images includes at least 100 images, each with the sample randomly moved within the sample area 108. The reason for randomly moving the sample within the sample area 108 is that not all of the molecules in the sample have the same alignment. Accordingly, the intensity fluctuates along the sample field of view. Additionally, the field of view of the image sensor covers only the sample area 108, so only information of the sample in the different positions is fed as a training set of images to the neural network to be trained. Therefore, the neural network avoids confusing geometrical patterns with spectral patterns.

At 518, the set of sample images captured by the image sensor are fed to the neural network to be trained as a set of labeled training images (e.g., the images are labeled as images of the target molecule). In various implementations, the neural network to be trained is a CNN and the neural network is trained using a progressive neural architecture search (e.g., PNASNet-5). At 520, the image sensor captures a set of test images of the sample which are classified by the trained neural network. A determination is made as to whether the trained neural network correctly classifies the set of test images with a threshold success ratio. In some implementations, the success ratio may be greater than 70 to 80%. Other success ratios may be used. If not, the process loops back to 516 for capturing another set of sample images for further training of the neural network.

Otherwise, at 522, the neural network is determined to successfully classify spectral images from the target molecule. At 524, a new molecule may be provided for training another neural network. As such, the neural network creates a model for identifying a target molecule. In an example, the training time on a Core i7, 12 GB Ram and a dedicated video card takes around 5 hours on average but sometimes could take more than 24 hours depending on the type of sample, such as for identifying more complex mixtures like coffee.

FIG. 6 illustrates experimental results of accuracy of detection of specified compositions. In the experimental results shown, a family of CNN's were trained with 100 images for the tests of acetaminophen (generic) and TYLENOL, with 200 images for the three different lipids, and 100 pictures of three different brands for the coffee, and the same type of roast. The number of training steps (e.g., 516-520 described above) depends on the difficulty to reach a classification rate over the specified success ratio (e.g., 80%). The lipids needed 35,000 steps of training while the acetaminophen only 25,000 to get a similar classification rate and in both cases the system was able to classify successfully randomly selected pictures of each of the molecules and in every case getting classification ratings over 85% (95% in acetaminophen's case). For coffee, 150,000 steps were needed to attain classification ratings over 96%.

In the examples provided above, the imaging instrument 100 includes one target filter region and one light source frequency. However, in some implementations, more than one target filter region and more than one light source may be used. For example, in addition to illumination by a 405 nm laser, the sample may additionally be illuminated with a UV laser. Many cell phone cameras have an integrated UV filter prior to the image sensor and thus if the sample is additionally illuminated with a UV laser, the accuracy can be improved for some substances.

It should be appreciated that the logical operations described herein with respect to the various figures may be implemented (1) as a sequence of computer implemented acts or program modules (i.e., software) running on a computing device (e.g., the computing device described in FIG. 7), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 7:
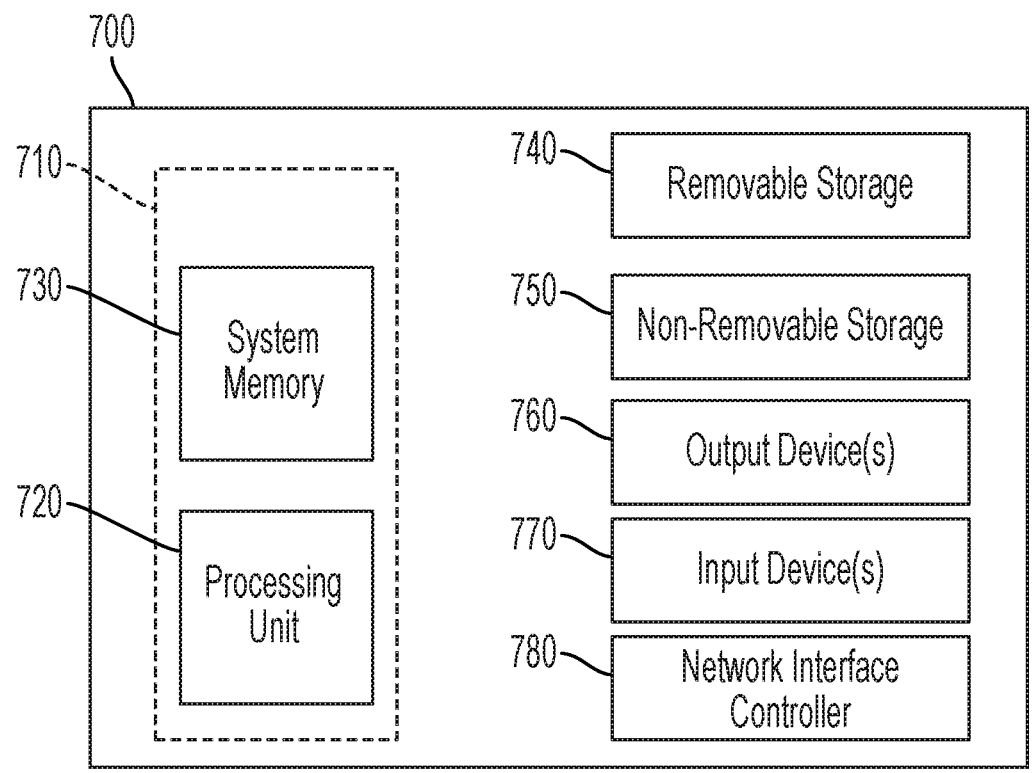
FIG. 7 illustrates an exemplary computer system suitable for implementing the several embodiments of the disclosure.

Referring to FIG. 7, an example computing device 700 upon which embodiments of the invention may be implemented is illustrated. For example, the computing device 402 described herein may be implemented as a computing device, such as computing device 700. It should be understood that the example computing device 700 is only one example of a suitable computing environment upon which embodiments of the invention may be implemented. Optionally, the computing device 700 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 700 to provide the functionality of a number of servers that is not directly bound to the number of computers in the computing device 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 700 typically includes at least one processing unit 720 and system memory 730. Depending on the exact configuration and type of computing device, system memory 730 may be volatile (such as random access memory (RAM)), non-volatile (such as read-only memory (ROM), flash memory, etc.), or some combination of the two. This most basic configuration is illustrated in FIG. 7 by dashed line 710. The processing unit 720 may be a standard programmable processor that performs arithmetic and logic operations necessary for operation of the computing device 700. While only one processing unit 720 is shown, multiple processors may be present. Thus, while instructions may be discussed as executed by a processor, the instructions may be executed simultaneously, serially, or otherwise executed by one or multiple processors. The computing device 700 may also include a bus or other communication mechanism for communicating information among various components of the computing device 700.

Computing device 700 may have additional features/ functionality. For example, computing device 700 may include additional storage such as removable storage 740 and non-removable storage 750 including, but not limited to, magnetic or optical disks or tapes. Computing device 700 may also contain network connection(s) 780 that allow the device to communicate with other devices such as over the communication pathways described herein. The network connection(s) 780 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 700 may also have input device(s) 770 such as a keyboards, keypads, switches, dials, mice, track balls, touch screens, voice recognizers, card readers, paper tape readers, or other well-known input devices. Output device(s) 760 such as a printers, video monitors, liquid crystal displays (LCDs), touch screen displays, displays, speakers, etc. may also be included. The additional devices may be connected to the bus in order to facilitate communication of data among the components of the computing device 700. All these devices are well known in the art and need not be discussed at length here.

The processing unit 720 may be configured to execute program code encoded in tangible, computer-readable media. Tangible, computer-readable media refers to any media that is capable of providing data that causes the computing device 700 (i.e., a machine) to operate in a particular fashion. Various computer-readable media may be utilized to provide instructions to the processing unit 720 for execution. Example tangible, computer-readable media may include, but is not limited to, volatile media, non-volatile media, removable media and non-removable media implemented in any method or technology for storage of information such as computer readable instructions, data structures, program modules or other data. System memory 730, removable storage 740, and non-removable storage 750 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 720 may execute program code stored in the system memory 730. For example, the bus may carry data to the system memory 730, from which the processing unit 720 receives and executes instructions. The data received by the system memory 730 may optionally be stored on the removable storage 740 or the non-removable storage 750 before or after execution by the processing unit 720.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 8:
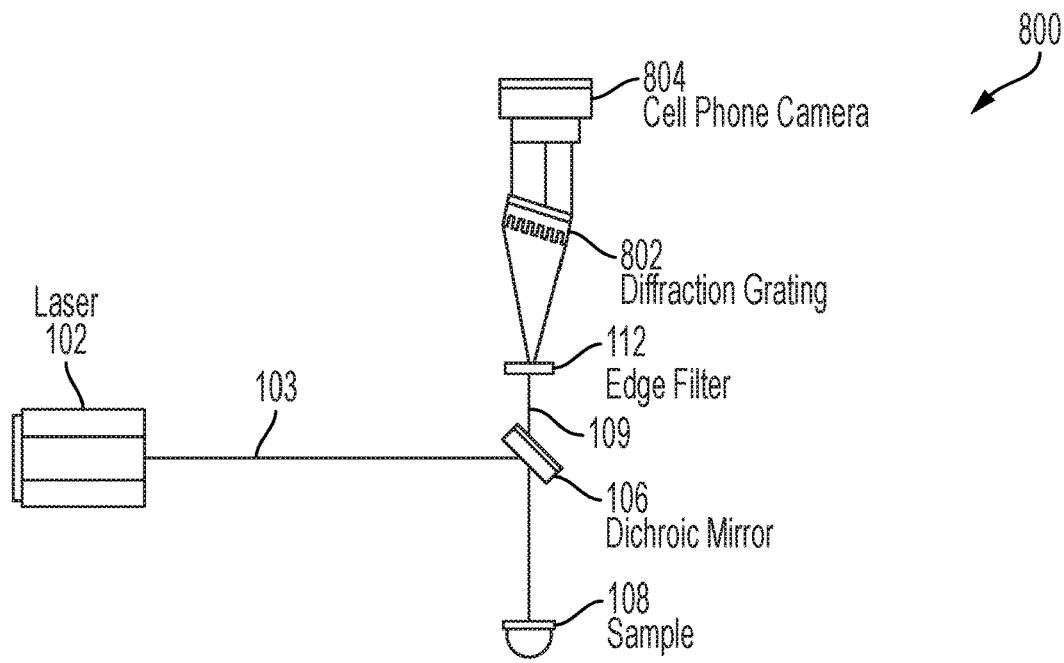
FIG. 8 illustrates an optical system diagram of an imaging instrument suitable for implementing another aspect of the disclosure.

FIG. 8 illustrates an optical system diagram of an imaging instrument 800 suitable for implementing another aspect of the disclosure. The imaging instrument 800 is adapted to capture inelastic and elastic scattering radiation. The imaging instrument 800 is substantially similar to the imaging instrument 100 described above, where like numerals represent like parts. The imaging instrument 800 has a reduced cost in comparison to the imaging instrument 100 by removing the laser line filter 104 and replacing the bandpass filter 114 with a diffraction grating 802.

Upon testing, it was determined that the trained neural network 406 was robust enough to address any undesired artifacts in the received image signal and still be successful in the spectral imaging classification. This has been done by testing the instrument in a highly demanding scenario where not only detection of a substance is confirmed, but detection of a concentration of the substance is also performed.

The imaging instrument 800 includes a diffraction grating 802 that replaces the bandpass filter 114. This change was made in part because of the decreased price of the diffraction grating 802 in comparison to the bandpass filter 114. The imaging instrument 100 was designed to capture a specific region of the inelastic spectrum ~(800-1400) cm$^{-1}$ but the imaging instrument 800 can now cover from ~(200-3000) cm$^{-1}$, and a portion of the elastic scattering due to the removal of one of the filters. The inclusion of elastic scattering in the images captured by the imaging instrument 800 plays a role in the quantification of substances since this radiation is 1000 times stronger than inelastic scattering. In use, a CCD/CMOS sensor 804 captures an image that includes the spectral distribution provided by the diffraction grating 802.

FIGS. 9A-9D illustrate a prototype imaging instrument 900 suitable for implementing the optical system 800 of FIG. 8. The imaging instrument 900 includes a housing 902 for arranging the components of the imaging instrument 800 described above. In the example shown, the housing 902 is constructed as a 3D printed part. In some implementations, the housing 902 may be constructed of mechanical parts. The housing 902 comprises a light source mount block 904, a sampling block 910, and a diffraction grating block 912.

The light source mounting block 904 has one or more surfaces for mounting the light source 102 to the housing 902. The light source mount block 904 comprises a base 905 and a face 906. The base 905 is sized and shaped to support the light source 102 on the light source mount block 904. The face 906 includes one or more keying protrusions 908. In the example show, a top surface of the face 906 comprises two keying protrusions 908. More or fewer keying protrusions 908 may be used. A control board 906 is mounted to the light source mount block 904 and provides a low cost control to enable laser mode, power stability, and control. In some implementations, a battery-based power supply (not shown) may be used.

Figure 9A:
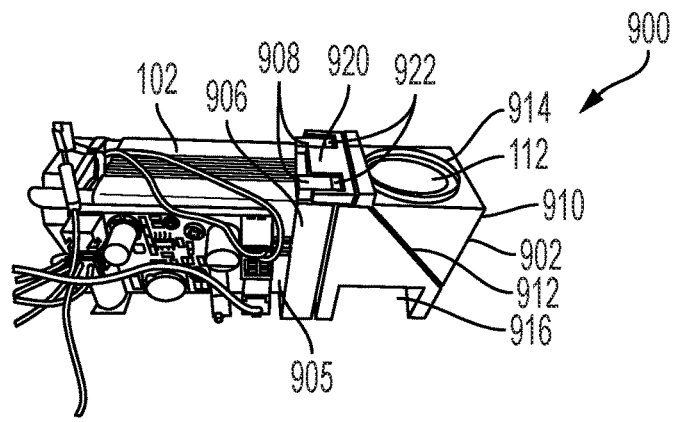
FIGS. 9A-9D illustrate a prototype imaging instrument suitable for implementing the optical system of FIG. 8.
Figure 9B:
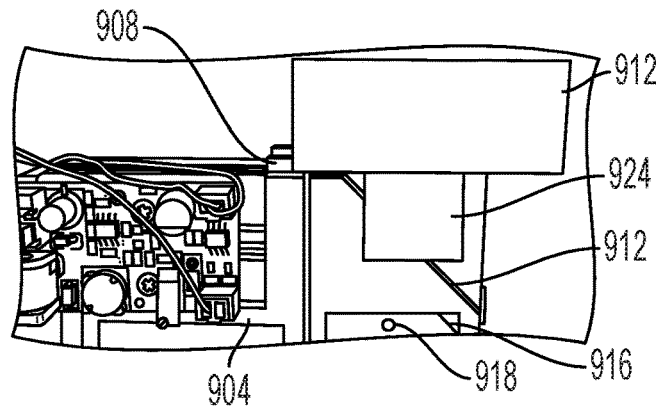

The sampling block 910 comprises a dichroic mirror slot 912, an edge filter aperture 914, and one or more sample detection area slot(s) 916. The dichroic mirror slot 912 is sized and shaped to receive the dichroic mirror 106. The one or more sample detection area slot(s) 916 provide access to the sample area 108. As shown in FIG. 9B, light 918 produced by the light source 102 is shown to be reflected by the dichroic mirror 910 and incident on the sample area 108. A holder (not shown) may be placed within the sample area slot 912 to align a sample with the sample area 108. In various implementations, the holder may be a slide or other structure configured to position a prepared sample in the sample area 108. A top surface of the sampling block 910 comprises the edge filter aperture 914 sized and shaped to receive the edge filter 112. The top surface of the sampling block 910 also includes one or more slots 920 adapted to fit between and/or around the keying protrusions 908. The slots 920 and the keying protrusions 908 facilitate physical alignment of the sampling block 910 with the light source mounting block 904.

The diffraction grating block 912 is configured to house the diffraction grating 802 and aligning the image sensor 804 with diffraction grating 802. The diffraction grating block 912 comprises one or more protrusions (not shown) adapted to fit within a groove 922 formed between the keying protrusions 908 and the slots 920. Additionally, the diffraction grating block 912 comprises one or more alignment tabs 924 that extend from the diffraction grating block 912 and are sized to fit around the sampling block 910. While only one alignment tab 924 is shown in FIG. 9B, another alignment tab may be present on the other side of the diffraction grating block 912 at a corresponding position. Together, the protrusions of the diffraction grating block 912 and the alignment tabs 924 enable optical alignment of the diffraction grating block 912 with the sampling block 910.

Figure 9C:
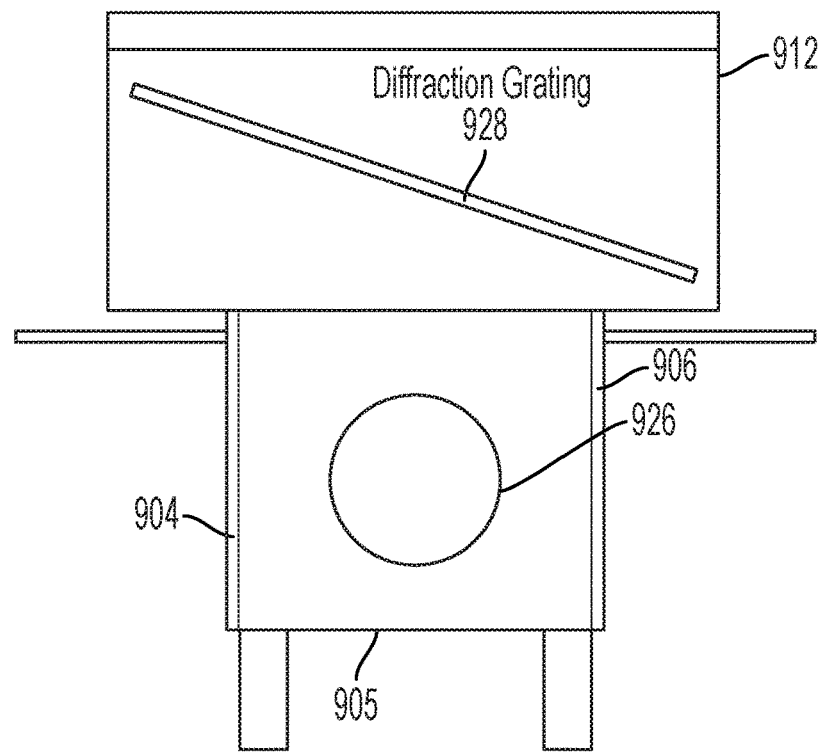
Figure 9D:
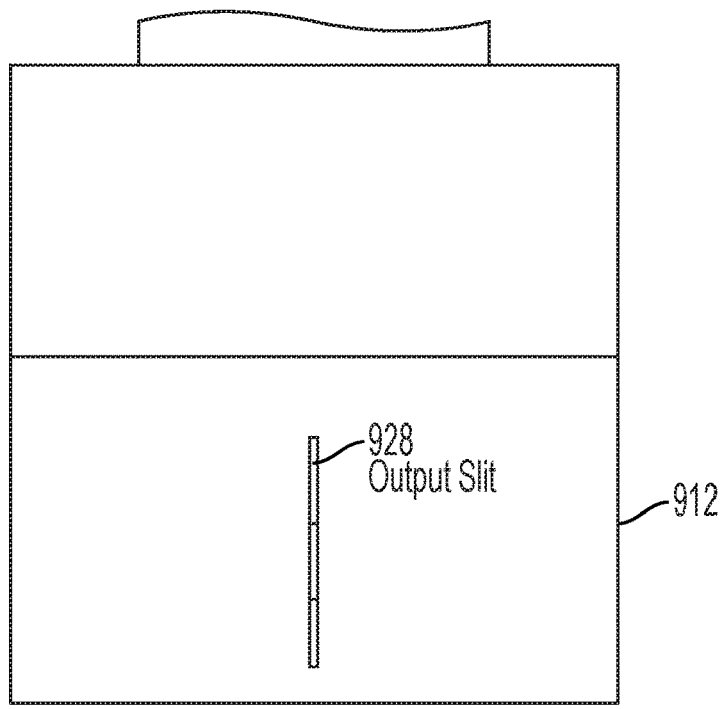

FIG. 9C shows a front view of the housing 902 with the sampling block 910 removed. As shown the face 906 of the light source mount block 904 comprises an aperture 926 for receiving light produced by the light source 102. Also shown in FIG. 9C, the diffraction grating block 912 comprises a front face with a diffraction grating slot 928 for receiving the diffraction grating 802. FIG. 9D shows a top view of the housing 902. As shown, the diffraction grating block 912 also comprises a top surface with an output slit 928 for receiving output light from the diffraction grating 802. The top surface of the diffraction grating block 912 may also include one or more alignment features for aligning an image sensor of a cell phone with the sample area 108. The diffraction grating block 912 provides the diffraction grating 802 with an optimal position to produce a sharper spectrum suitable for image recognition. In use, the image sensor 804 captures an image of the spectrum provided by the diffraction grating 802 through the output slit 928. As described above, the image processing identification system 400 uses the images captured by the image sensor 804 to output a classification 408 of whether or not the image 404 is of a sample with a target molecule.

Figure 10:
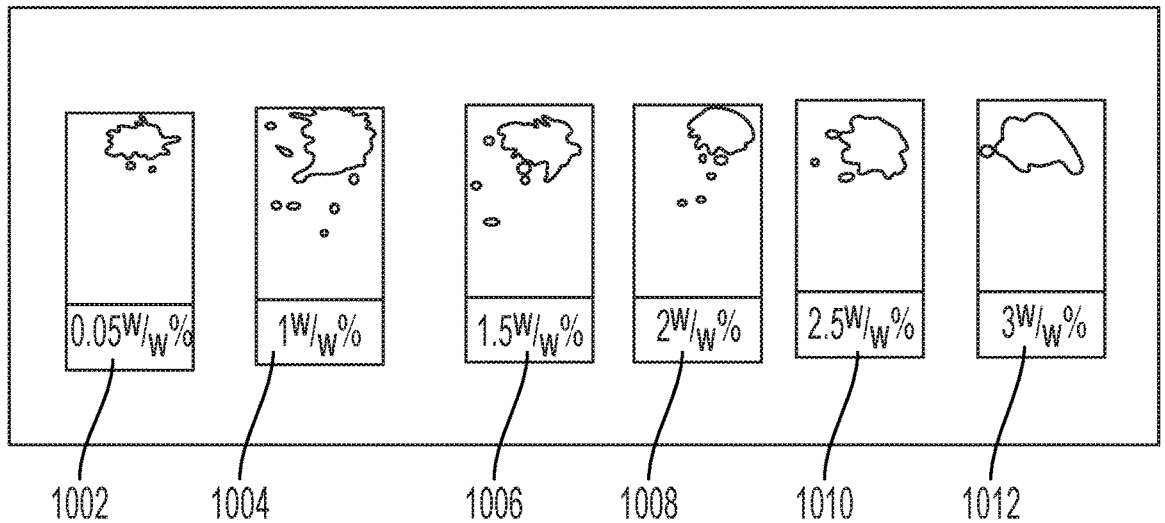
FIG. 10 illustrates example training samples of different concentrations of a known substance for training a neural network.

FIG. 10 illustrates example training samples of different concentrations of a known substance for training a neural network. In an example, different concentrations of aspirin in a range between (0.5-3) weight/weight % (w/w %) ratio of aspirin in acetaminophen are prepared for training and identification. As shown, sample 1002 includes a concentration of aspirin of 0.5 w/w %, sample 1004 includes a concentration of aspirin of 1 w/w %, %, sample 1006 includes a concentration of aspirin of 1.5 w/w %,%, sample 1008 includes a concentration of aspirin of 2 w/w %,%, sample 1010 includes a concentration of aspirin of 2.5 w/w %,%, and sample 1012 includes a concentration of aspirin of 3 w/w %. In this example, the aspirin was used to simulate an undesired contaminant in the aforementioned concentrations to test whether the imaging instrument 800 is able to detect the different features caused by the addition of different concentrations of a target molecule.

In the example, the trained neural network 406 was tested with 6 different concentration ratios in the range between (0.5-3) w/w % with steps of 0.5 of aspirin on acetaminophen. This example shows that the imaging instrument 800 is able to detect a relatively small concentration and to distinguish between concentrations in similar samples. The trained neural network 406 is trained with images taken of the inelastic scattering signature of the mixtures. For each concentration, a set of 130 pictures were capture with the imaging instrument 800—100 images for the training the neural network 406 and the rest for testing the classification accuracy. The data set was randomly selected to avoid any bias. The training parameters of the neural network 406 were 300.000 steps and a learning rate of 0.05, on Tensorflow's Inception V3 model. Other neural network models are contemplated by this disclosure.

In various implementations, a separate neural network may be trained for each concentration of a target molecule to be identified. Following the example above, six convolutional neural networks may be trained using the capture training images for each of the six concentrations to be recognized. In such an architecture, each neural network may have a single input node for receiving an image captured from the imaging instrument 800 and a single output node for providing a classification of whether the target module is present at a given concentration.

In another example, a single neural network may be trained for all concentrations of the target molecule to be identified. In such an architecture, the neural network may have a single input node for receiving an image captured from the imaging instrument 800 and a plurality of output nodes, each output node providing a classification of whether the target module is present at a given concentration. Therefore, the number of output nodes is equal to the number of concentrations to be predicted. Following the example above, the neural network may have six output nodes, each output node corresponding to a different one of the concentrations of the target molecule to be identified. In various implementations, an output node with a largest value is selected as the detected concentration.

Following the example described above with sample preparations of aspirin/acetaminophen at different concentrations, the averaged results for the whole testing set are shown in Table 1.

TABLE 1

Testing accuracy for the training data set.

| TRIAL (w/w %) | % ACCURACY |
|---|---|
| 0.5 | 99.96 |
| 1.0 | 99.97 |
| 1.5 | 93.02 |
| 2.0 | 98.56 |
| 2.5 | 99.21 |
| 3 | 99.75 |

As shown in the results, in addition to being able to detect the small differences in the spectral signal and differentiate between very similar chemical species of aspirin and acetaminophen at concentrations of the target molecule as low as 0.5 w/w %, the imaging instrument 800 and trained neural network 406 are also able to detect the concentration of the target molecule at known concentrations.

Figure 11:
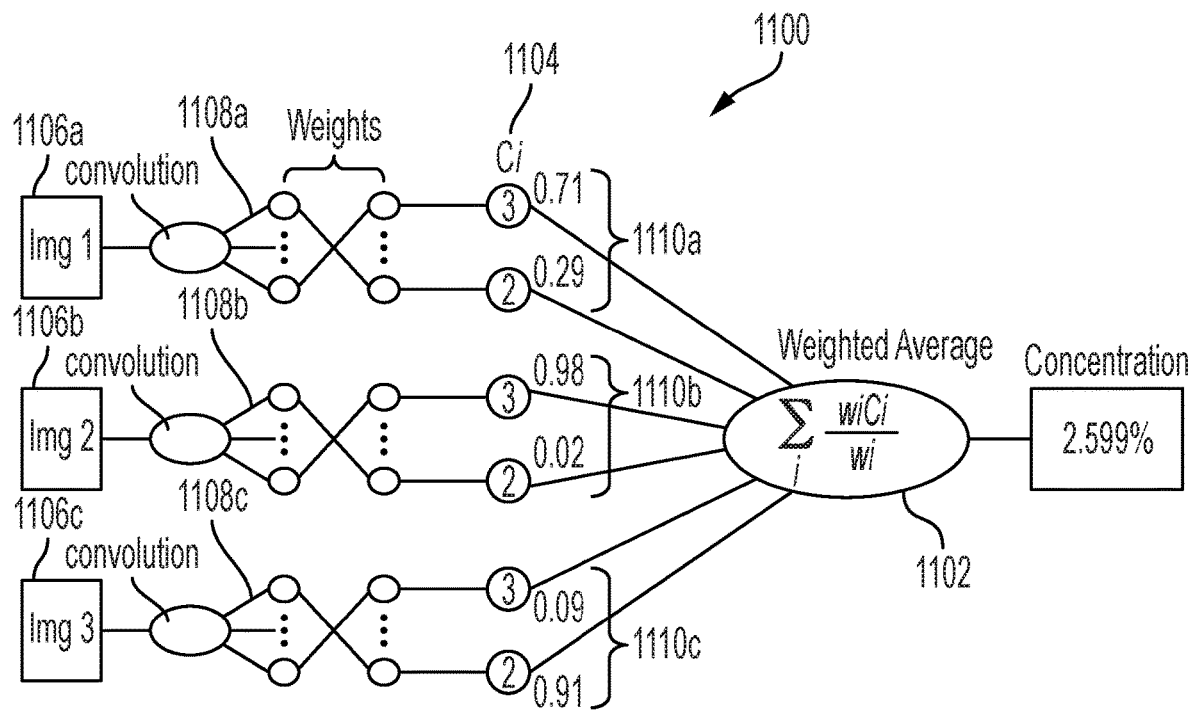
FIG. 11 illustrates a neural network and weighted average of neural network output nodes for predicting a concentration of a target substance other than a concentration used to train the neural network.

FIG. 11 illustrates a neural network 1100 and a weighted average 1102 of neural network output nodes 1104 for predicting a concentration of a target molecule other than a concentration used to train the neural network. Following the results above, an assessment is made of whether the imaging instrument 800 and trained neural network 406 are able to infer the concentration of a target molecule at a concentration other than a concentration used to train the neural network. In an example, an inferred concentration is tested when test images for one of the concentration amounts of the target molecule is not present. For example, the test images of the sample 1010 the 2.5 w/w % ratio are removed from the training data set and the neural network 406 was trained again with the aforementioned parameters. The concentration was calculated by applying a weighted average over randomly selected values of the 2.5 w/w % ratio data set.

$$\overline{W.A} = \frac{\sum_i \omega_i C_i}{\sum_i \omega_i} \qquad \text{Equation (1)}$$

For example, as shown in FIG. 11, a plurality of input images of samples at the 2.5 w/w % concentration are capture by the imaging instrument 800 are provided to a respective plurality of neural networks. For example, input image 1106a is provided to an input node of convolutional neural network 1108a. Likewise, input images 1106b and 1106c are provided to input nodes of neural networks 1108b and 1108c, respectively. Each neural network has output nodes, which determine a classification for a trained concentration. For example, output nodes 1110a provide a classification of the sample by the neural network 1108a with respect to a trained concentration of 3 w/w % and a classification of the sample with respect to a trained concentration of 2 w/w %. Likewise, output nodes 1110b, 1110c provide classifications of the respective input images 1106b, 1106c for the trained concentrations using respective neural networks 1108b, 1108c.

The results are shown in Table 2.

TABLE 2

Results for an unknown concentration calculated through a weighted average.

| INFERENCE FOR 2.5% w/w | | | |
|---|---|---|---|
| $C_i$ | | $\omega_i$ | |
| 3 | 0.7166 | 0.9991 | 0.081 |
| 2 | 0.2815 | 0.0007 | 0.9185 |
| W.A. = | | 2.5994% ± 0.09 Predicted Value | |

As shown above, the imaging instrument 800 was able to correctly calculate the concentration of an unknown point with a relatively small error value, predicting that the concentration value is around 2.6 w/w %, which is close to the theoretical 2.5 w/w % value. Therefore, the imaging instrument 800 can successfully quantify an untrained value. This indicates that the methodology and the model used for machine learning are robust enough to be applied to analytical chemistry applications and an expanded range of potential uses, for instance the detection of pathogens, trace quantities of drugs, dangerous concentration levels of substances (e.g. lead or copper in water).

In comparison with the imaging instrument 100, the imaging instrument 800 was tested in two different scenarios: 1) with a lower concentration (0.5%), whereas prior tests had a lower limit that was 1% and 2) to determine if it is possible to infer concentrations not included in the training data set. In both circumstances the imaging instrument 800 demonstrated the capacity to not only detect the correct concentration with a currently demonstrated detection limit of 0.5% w/w from an image but also to work out concentrations not included in the training set. This result means that the instrument now is able to quantify targeted substances in laboratory-controlled conditions.

Figure 12:
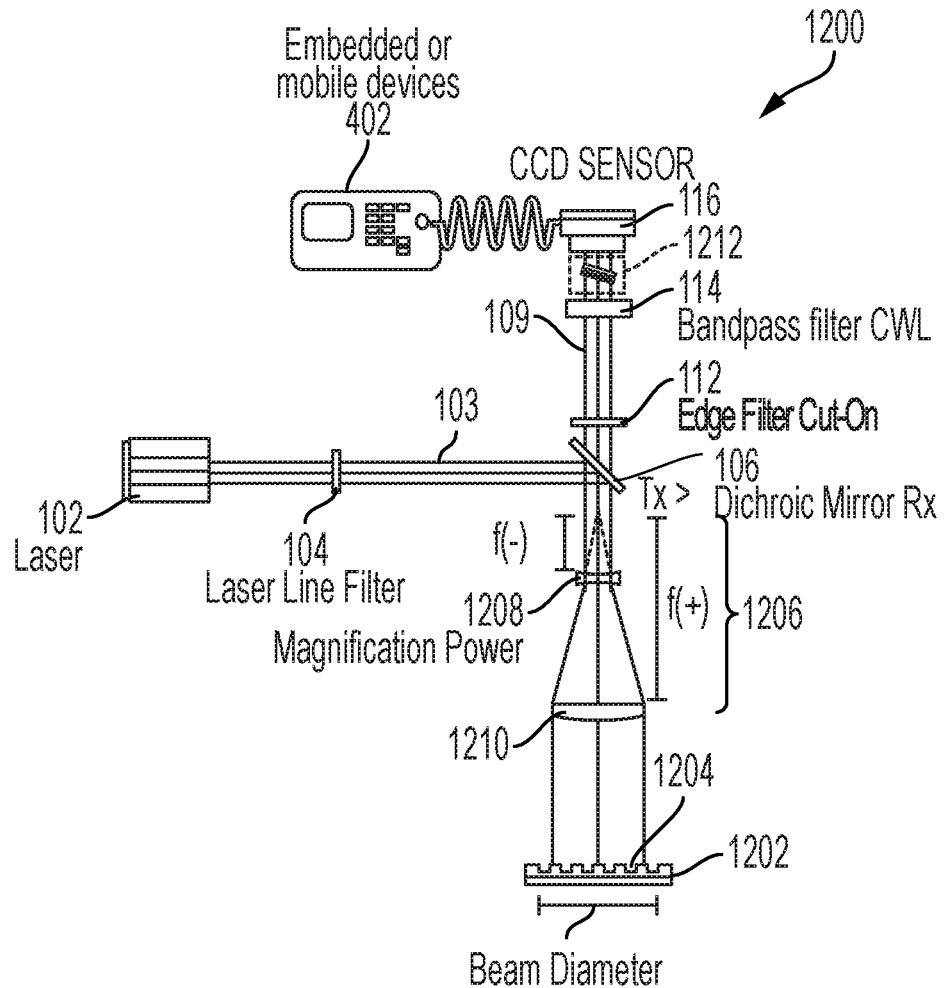
FIG. 12 illustrates an optical system diagram of an imaging instrument suitable for implementing diagnostic aspects of the disclosure.

FIG. 12 illustrates an optical system diagram of an imaging instrument 1200 suitable for implementing diagnostic aspects of the disclosure. For example, the imaging instrument 1200 provides for detection of viruses and/or antibodies to the viruses, such as the COVID 19 virus and the antibodies produced from exposure and/or acquiring the COVID 19 virus.

The imaging instrument 1200 is used in conjunction with a lateral flow assay 1202, for example, to capture an image of the assay. Other types and designs of assays are contemplated by this disclosure including a microfluidic assay or any other type of assay. The assay 1202 contains an array of wells 1204, where each well 1204 has different concentrations of an antibody or antigen, such as an antibody or antigen for the COVID 19 virus. Additionally, one or more of the wells 1204 are provided as a control well or spot on the assay 1202.

In separate or adjacent arrays of within the same assay 1202, a flow pathway for a serum or bodily secretion is provided. Detection of the virus itself as well as the separate flow path for detection the antibody, antibodies, antigens, or products of the antibody-antigen interaction are captured through imaging of the entire assay 1202. For example, secretions, throat or sinus or other, and/or blood or serum aliquots or components of such, would be introduced to the assay 1202, or the assay itself is dipped in a sample or a sample solution. There may or may not be a series of chemical washings or exposure prior to capturing an image of the assay 1202 with the imaging instrument 1200.

In some implementations, an array of the assay 1202 would be tested by the imaging apparatus 1200 such that the rows and columns may registered with a symbol or number, or more simply, one mark in one or more corners of a rectangular array on the assay 1200, or a directional symbol elsewhere on the array to orient and calibrate the distances to the sections of the array.

In various implementations, an image of the assay 1202 with the imaging instrument 1200 will contain fluorescence from a fluorophore that is attached to some part of the assay 1202 (either is the chemical flow and once "bound" will produce a signal or its inherent signal will be suppressed, or the fluorophore will be bound to a substrate of the assay 1202 through the antigen or antibody that is bound prior to flow of the analyte). In some implementations, nanoparticles might be used or other enhancement strategy on an assay such that the detection would be the enhanced inelastic scatter and/or the enhanced fluorescence response or suppression of such. Quantification of the instrument response is envisioned such that the imaging instrument 1200 can quantify the virus particles or the virus antibodies in the flow. The assay could contain or chemical washes to be used could contain antibodies, antigens, single chain antibodies, fragments of antibodies, and enhancement chemicals in the wash and/or attached to these molecules in the flow or attached to the assay 1202 being imaged.

The imaging instrument 1200 is substantially similar to the imaging instrument 100 described above, where like numerals represent like parts. In an example implementation, the laser line filter 104 is a 405 nm filter, the dichroic mirror 106 is a dichroic longpass mirror filter with reflection at 404 nm and transmission greater than 410 nm. Accordingly, the dichroic mirror 106 transmits scattered light from the assay 1202 along the detection path 109 at a wavelength greater than that of the light supplied along the illumination optical path 103. The edge filter 112 is a longpass filter with a cut-on wavelength at 410 nm. The bandpass filter 114 is a 430 nm bandpass filter with a FWHM of 2 nm. As discussed below, the bandpass filter 114 may be adjusted depending on the type of assay 1202 being performed to capture an image of fluorescence, Stokes scattering, or anti-Stokes scattering from the assay 1202.

In this embodiment, the optics of the illumination optical path 103 of the assay 1202 and the optical design of detection path 109 will be modified such that the entire assay will be illuminated and captured as one image. Specifically, the imaging instrument 1200 additionally comprises a magnification lens assembly 1206 for magnifying the light produced by the light source 102 such that the light source extends across the entire assay 1202. In the example show, the magnification lens assembly 1206 comprises a bi-convex lens 1208 and a plano-convex lens 1210, though other magnifying lens arrangements are contemplated by this disclosure. Accordingly, a single image may be captured of the assay 1202 by an image sensor of the imaging instrument 1200. In various implementations, the imaging instrument 1200 includes cylindrical optical assemblies to allow such simultaneous detection.

Figure 13:
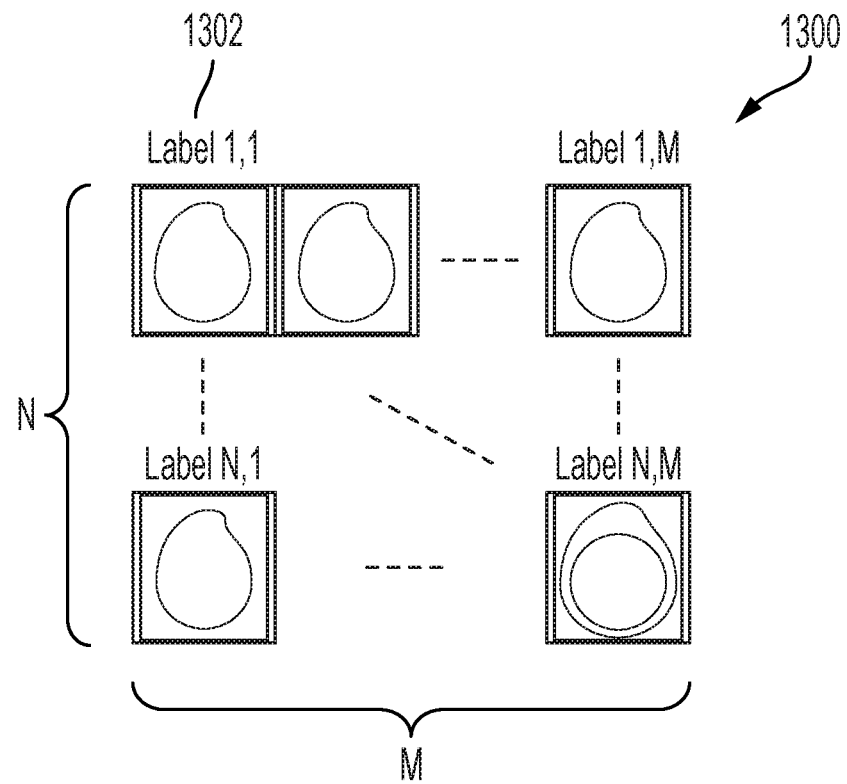
FIG. 13 illustrates a labeled training image captured by the optical system of FIG. 12.

An image captured by an image sensor of the imaging instrument 1200 includes position and intensity information from multiple wells of the assay 1202. When the image sensor is a color image sensor, the captured image will additionally contain color information. The position information encodes the intensity (and color, when present) information for different areas in the image to individual wells on the assay 1202. Accordingly, the image shows elastic scattering, induced fluorescence, and/or inelastic scattering produced by the wells of the assay 1202 as an array of intensity (and color) information, such as shown in FIG. 13. The spectrum of light incident on the image sensor is different than the spectrum of light produced by the light source 102. The image captured by an image sensor of the imaging instrument is provided to computing device 402 for processing to determine the presence and/or concentration or amount of virus present in one or more wells of the assay 1202.

Depending on the type of assay, the bandpass filter 114 may be selected to filter out undesired wavelengths and thereby select wavelengths for capturing in the image by the imaging instrument 1200. For example, the bandpass filter 114 may select to image fluorescence from the assay 1202, Stokes scattering from the assay 1202, or anti-Stokes scattering from the assay 1202. In the case of anti-Stokes scattering detection scenario, the edge filter cut-on 109 would be either a short pass filter or a notch filter that would enable shorter wavelength light to pass relative to the laser wavelength from the light source 102. In some implementations, the imaging instrument 1200 has two optical pathways on the detection path 109 for simultaneously capturing images of a combination of assay emission of non-overlapping regions of spectrum, for example, fluorescence and inelastic scatter. In some implementations, a diffraction grating 1212 may additionally be positioned between the bandpass filter 114 and an image senor of the imaging instrument 1200. Optionally, one or more of the laser line filter 104 and/or the edge filter 112 may be excluded when the diffraction grating 112 is present.

In another embodiment, the illumination light may scan the assay 1202 in sections and capture an image of each section as a function of time and correlate the captured images back to an assay position. In some implementations, both the virus and antibody (or antibodies) against the virus can be quantified by the imaging instrument 1200 simultaneously. In some implementations, separate assays for virus versus the antibody (or antigen) may be provided or one assay may be imaged one at a time or in parallel.

FIG. 13 illustrates a labeled training image 1300 captured by the imaging instrument 1200 of FIG. 12. As shown in FIG. 13, each training image comprises an N×M array of intensity (and color) information of the assay emission from the wells on the assay 1202. Accordingly, a label 1302 is provided for each well location on the assay 1202. For example, at each emission location, which corresponds to each well location on the assay, a bounding box is provided to label the emission accordingly. Accordingly, N×M labels are provided on each training image 1300.

Figure 14:
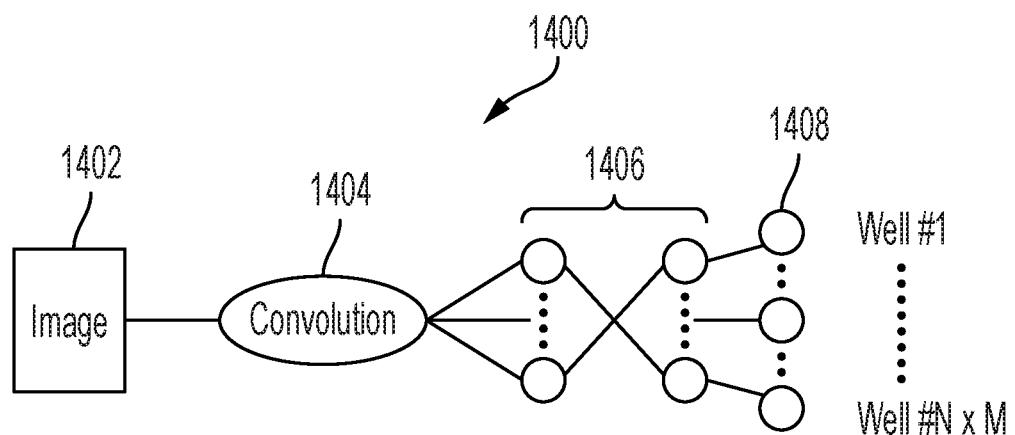
FIG. 14 illustrates a convolutional neural network architecture for diagnostic determinations.

FIG. 14 illustrates a convolutional neural network 1400 for diagnostic determinations. The neural network 1400 receives an input image 1402 with an array of well emissions from the assay 1202 at a single input node 1404. The neural network 1400 includes one or more hidden layers 1406 and provide a plurality of output nodes 1408. Each of the output nodes corresponds to a well location on the assay 1202. Accordingly, the neural network 1400 includes N×M output nodes.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of training a neural network to classify an image captured from an imaging device as an identified substance, the method comprising:
    capturing, by an image sensor, a first set of a predetermined number of images of scattered light from a known substance, wherein in each of the predetermined number of images of the known substance is illuminated over an exposure time by a monochromatic light source at a first location in a sample zone, and wherein the scattered light is filtered to a predetermined range of wavenumber;
    supplying the first set of images as training input to a neural network executing on a processor;
    determining, by the processor, whether the neural network correctly classifies a threshold amount of the first set of images as being from the known substance;
    upon a determination that the neural network correctly classifies less than the threshold amount of the first set of images as being from the known substance, capturing, by the image sensor, a second set of the predetermined number of images of scattered light from the known substance illuminated by the monochromatic light source at a second location in the sample zone.

2. The method of claim 1, further comprising:
    supplying monochromatic light from the monochromatic light source along an illumination path; and
    directing monochromatic light from the monochromatic light source to the sample zone.

3. The method of claim 2, wherein the monochromatic light from the light source is directed to the sample zone with a dichroic mirror positioned along the illumination path.

4. The method of claim 3, further comprising:
    filtering the scattered light with a bandpass filter to the predetermined range of wavenumber.

5. The method of claim 1, further comprising:
    validating, prior to capturing the first set of predetermined number of images, that light scattered from the known substance by the is within a valid range of wavenumber when illuminated by the monochromatic light source.

6. The method of claim 5, wherein the valid range of wavenumber is within a range of wavenumber for Raman scattering.

7. The method of claim 5, wherein the validating comprises:
    passing the scattered light through a wavelength dispersive assembly to determine a range of wavenumber present in the scattered light; and
    comparing, by the processor, the range of wavenumber present in the scattered light to the valid range of wavenumber.

8. The method of claim 7, wherein the wavelength dispersive assembly comprises a spectrometer, prism, or a diffraction grating.

9. The method of claim 7, further comprising:
    comparing, by the processor, the range of wavenumber present in the scattered light with pre-stored spectra of the known substance maintained in a database.

10. A method of identifying an unknown substance with a trained neural network to classify an image captured from an imaging device as an identified substance, the method comprising:
    capturing, by an image sensor, a first image of scattered light from the unknown substance, wherein in the first image, the unknown substance is illuminated over a first exposure time by a first monochromatic light source in a sample zone, and wherein the scattered light for the first image is directed to a filter and filtered to a predetermined range of wavenumber;
    capturing, by the image sensor, a second image of scattered light from the unknown substance, wherein in the second image, the unknown substance is illuminated over a second exposure time by a second monochromatic light source in the sample zone, and wherein the scattered light for the second monochromatic light source is directed to the filter and filtered to a second predetermined range of wavenumber;

supplying the first and second images as inputs to a trained neural network executing on a processor;

identifying, by the neural network, the unknown substance based on the first and second images.

11. The method of claim 10, further comprising:

directing the scattered light to a diffraction grating positioned in a detection path between the filter and the image sensor.

12. The method of claim 11, further comprising:

directing the scattered light from the diffraction grating to a housing, the housing comprising an imaging surface with a slit formed therein for receiving light passing through the diffraction grating.

13. The method of claim 11, further comprising:

using a magnification lens assembly and magnifying the monochromatic light along an illumination path to extend across an assay.

\* \* \* \* \*